United States Patent [19]

Headlund et al.

[11] Patent Number: 4,524,419

[45] Date of Patent: Jun. 18, 1985

[54] SYSTEM FOR DETERMINING THE OPTIMAL GROUND DEPTH OF AN OPHTHALMIC LENS HAVING A CLOSED HOMEOMORPHIC BOUNDARY

[75] Inventors: Larry M. Headlund, Brookline; Gary J. Marksteiner, Boston; Richard S. Sidell, Needham, all of Mass.

[73] Assignee: Intelab Medical Systems, Inc., Boston, Mass.

[21] Appl. No.: 417,547

[22] Filed: Sep. 13, 1982

[51] Int. Cl.³ ............................................. G06F 15/46
[52] U.S. Cl. .................................... 364/474; 364/525; 51/284 E; 51/165.72; 51/124 L; 356/127
[58] Field of Search ............... 364/525, 475, 474, 148; 51/284, 284 E, 165.72, 124 L; 356/124, 127, 382

[56] References Cited

U.S. PATENT DOCUMENTS

| | | | |
|---|---|---|---|
| 3,619,617 | 11/1971 | Kolb | 51/165.72 |
| 3,665,659 | 5/1972 | Kötting et al. | 51/284 |
| 3,786,600 | 1/1974 | Bloxsom | 51/284 E |
| 3,917,391 | 11/1975 | Padula et al. | 356/124 |

Primary Examiner—Jerry Smith
Assistant Examiner—Louis Woo

[57] ABSTRACT

The minimum edge thickness boundary of an ophthalmic lens is mathematically projected onto a plane containing a scaled image of the spectacle frame while the ground depth of the lens is dynamically varied to obtain circumscription with the image. Optimal tool settings are then determined which will result in a ground prescription lens having minimum overall thickness.

4 Claims, 7 Drawing Figures

CALCULATION OF OPTIMAL TOOL SETTINGS

SYSTEM FOR DETERMINING THE OPTIMAL GROUND DEPTH OF AN OPHTHALMIC LENS HAVING A CLOSED HOMEOMORPHIC BOUNDARY

FIELD OF INVENTION

This invention relates to an ophthalmic lens grinding technique and more particularly to improved apparatus and method for quickly and accurately determining the optimal tool settings needed to grind the surface of a lens blank to prescription and to obtain a finished lens which when shaped to fit the spectacle frame is as light as possible within industry safety guidelines.

BACKGROUND OF INVENTION

Grinding a torical section into a lens blank to optimal depth requires data relating to the selected spectacle frame size and shape. There are currently two systems in use which describe the size and shape of commercially available frames. The older method uses an orthogonal box approximation where a rectilinear region A·B based on horizontal and vertical frame dimensions A and B describes the smallest region which will circumscribe the perimeter of the frame, and a circular region $\widehat{ED}$ describes the polar field of a vector which extends from the center of A·B to the outermost effective perimeter of the frame. A closed region C is generated by intersecting the rectilinear and circular regions, such that $C = A \cdot B \cap \widehat{ED}$. The perimeter of C is then used as a first order approximation to the frame shape in minimum edge thickness calculations. A method more accurate than the first approach involves development of C from a spline fit tangentially to coordinates sampled regularly about the perimeter of the actual frame to be used. These coordinates are generally stored in conjunction with the size and style of the frame and maintained in a mass storage device for later use in lens optimization calculations. The symmetry assumptions made by the first system essentially insure that a lens blank will be ground to less than optimal depth and result in excessively thick spectacles when high powers are prescribed. The second system, although accurate, requires considerable information storage due to the large number of frame styles and sizes in popular use, and additionally requires that the database be regularly updated with new types before lens thickness optimization can be universally applied to all ophthalmic prescriptions.

SUMMARY OF INVENTION

A general objective of the subject system is to eliminate the expense and inconvenience of maintaining a spectacle frame database when the frame itself is on hand, and to permit lens thickness optimization to be applied universally when either standard or non-standard frames are prescribed. A further objective is to provide a general method for lens thickness optimization which is well-suited to computerized processing of all ophthalmic prescriptions that require precision surface grinding.

The invention features a method and a system for determining the optimal ground depth of an ophthalmic lens having a closed homeomorphic boundary. The technique implemented by the system method involves displaying the image of the orbit obtained by mathematical projection of the boundary of a lens which satisfies the prescription and visually superimposing a projection of a spectacle frame or frame pattern onto said display. The orbit is dynamically computed and displayed for varying lens thickness until the image appears to circumscribe the projection of the spectacle frame. The optimal lens thickness may then be determined and the final tool settings calculated for obtaining the specific optimal lens thickness.

DISCLOSURE OF PREFERRED EMBODIMENT

Other objects, features, and advantages will occur from the following description of a preferred embodimnt and the accompanying drawings, in which:

FIG. 1 depicts the closed homeomorphic boundary 1 of 3-dimensional solid 2 formed by the intersection of torical surfaces f and g (shown sectional) oriented in space about and inclined from a mutual axis along which the surface plane 2, oriented normal to said axis, is spaced between said surfaces and 3-dimensional spectacle frame 3, the perimeter of said frame being approximately parallel to the corresponding surface section of L and translated in a direction parallel to 2 from the optical grinding center of L by a prescribed decentration vector;

Regions P, R and C are contained in plane 2. Orbit P represents a region defined by plane Poncelet projection of boundary 1 onto plane 2, perimeter R represents a region defined by visual projection of frame 3 onto plane 2, and box C represents a defined axially symmetric region based on frame parameters A, B and ED, such that C is formed by the intersection of the rectangle of smallest dimensions containing R and the circle of minimum radius containing R each centered about a point displaced from the optical grinding center of L by a prescribed decentration vector;

FIG. 2 depicts the elements of FIG. 1 viewed from a point normal to the axis which separates plane 2 from frame 3, and additionally, solid bodies 4 and 5 (shown sectional) which represent finished lens blanks derived from L of plus and minus power, respectively, and ground to optimal thickness based on the circumscription by orbit P of the projection R of frame perimeter 3;

FIG. 3 depicts the architecture of a general purpose computer 6 having a graphic planar display device 7, a graphic hardcopy device 8, a program/data storage device 9, and an operator data entry/control device 10;

FIG. 4 depicts the physical embodiment of general purpose computer 6a into an integrated package having a CRT 7a, thermal printer 8a, magnetic tape reader 9a, and a keyboard 10a. FIG. 4 additionally depicts the graphic display of regions C and P, contained in plane 2 of FIG. 1, onto 7a and 8a;

Figure 1:
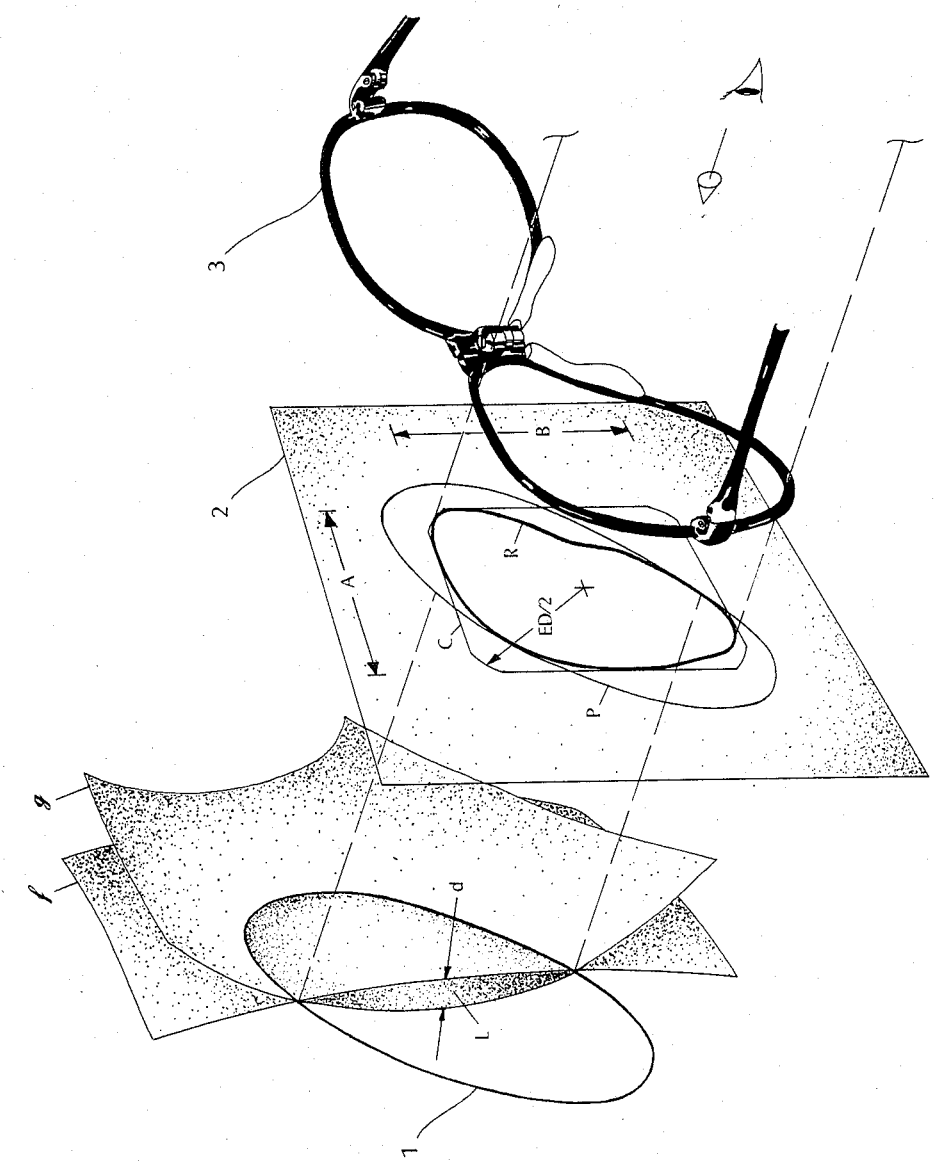
Figure 2:
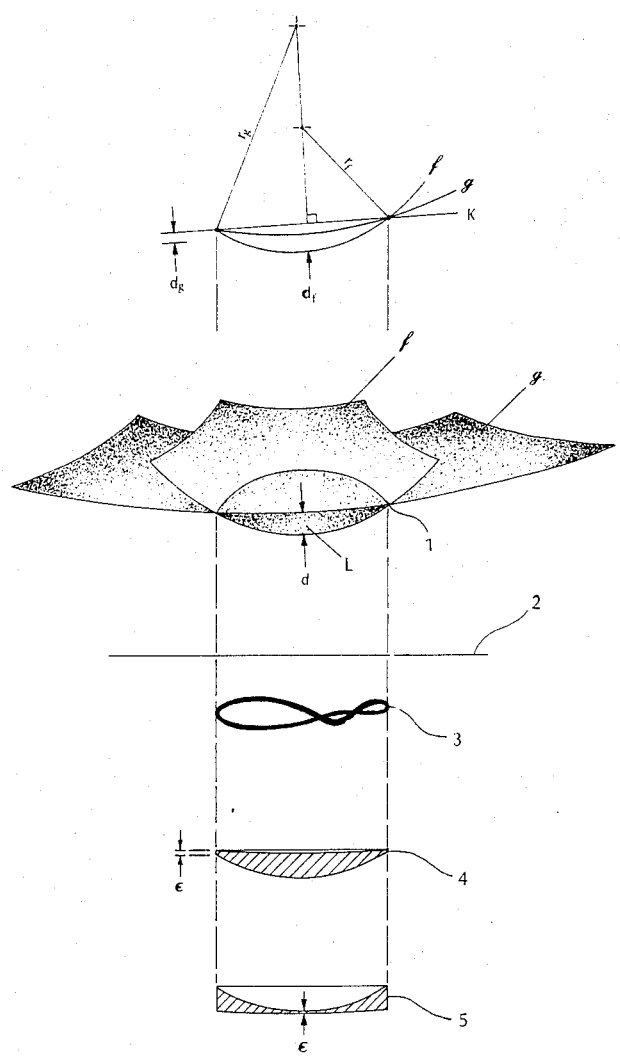

An interactive graphical methodology for determining an optimal homeomorphic lens boundary with respect to a specific spectacle frame is described with respect to FIGS. 1 and 2, an optimal homeomorphic boundary of solid L occurs at the minimum value of mutual axial displacement d between surfaces f and g for which P ⊃ R remains true. Surfaces f and g are oriented relative to plane 2 by defined axis and prism vectors. Displacement d between f and g is analogous to the thickness of solid L, which thickness can be minimized by contracting d until the projection of the 3-dimensional boundary 1 of solid L onto plane 2 as orbit P circumscribes region R.

Region R is bounded by the plane projection of the effective perimeter of frame 3 onto plane 2, such that C ⊃ R remains true. Closed region C is defined by the intersection of rectilinear region A·B and circular region $\widehat{ED}$ such that $C = A \cdot B \cap \widehat{ED}$, where A⊥B. Region A·B is based on horizontal and vertical frame dimensions A and B and describes the smallest region which will circumscribe the effective perimeter of frame 3. Circular region $\widehat{ED}$ describes the polar field of a vector which extends from the center of A·B to the outermost point of the projection of the effective perimeter of frame 3. The polar origin of region $\widehat{ED}$ is translated from the projected optical grinding center of solid L by a defined decentration vector.

Initially L(d) is chosen such that P ⊃ C for minimum d. For prescriptions resulting in an asymmetric orbit P it can be seen that circumscription of region R by P(d) is indeterminate with respect to the specific symmetry of frame 3.

By manual superposition of frame 3 onto plane 3 symmetric about region C, region R can be visually determined from any point in space positioned along an axis normal to the mechanical center of region C, provided that the distance from any point along the perimeter of frame 3 to plane 2 is negligible when compared with the viewing distance to plane 2. This condition can be readily met in practice. By dynamically contracting d→d* while visually observing region R, the condition P(d*) ⊃ R can be uniquely met, such that L(d*) is then uniquely determined at optimal d* with respect to the specific symmetry of frame 3.

A general optimization procedure is explained for obtaining parameters which will result in a lens of minimum thickness using an interactive graphical methodology to determine an optimal boundary value for the projection of the homeomorphic orbit of the lens.

For the purposes of this analysis, lens L is defined as a 3-dimensional solid homeomorphically bound by the intersection of 3-dimensional surfaces f and g and optionally by a cylinder with a diameter equal to the maximum diameter of the lens blank prior to grinding. A homeomorphic boundary occurs when surfaces f and g are developed from simple torical sections. Ophthalmic lenses are fully defined by the distance separating said f and g, by the radii of the circular sections of the torus used to form each of these surfaces, and by any mutual inclination of 'prism' which exists between them.

Projection P of L is contained in a plane perpendicular to the principal axis of L. The projection of the homeomorphic orbit of L forms the boundary of region P. This boundary may be found point by point by considering cross sections of the lens. On such a cross section the boundary points may be found by the simultaneous solution to the equations $$k^2 + (r_f - d_g)^2 = r_f^2 \quad (1)$$

$$k^2 + (r_g - d_g + a)^2 = r_g^2 \quad (2)$$

$$k^2 + (r_g - d_g)^2 = r_g^2 \quad (3)$$

$$d = d_g = d_f \quad (4)$$

$$a = d + r_f - r_g \quad (5)$$

where $r_f$, $r_g$ are the radii of curvature of the arc intercepted by the cross section on f and g respectively, $d_f$, $d_g$ are the greatest perpendicular distances from a chord K connecting the intersection points f and g respectively, and k is one half the length of chord K.

In the degenerate case where $r_f \to \infty$ ($d_f \to 0$)

$$k^2 + (r - d)^2 = r^2 \quad (6)$$

and r equals $r_g$ we note that from (1) and (3)

$$\frac{d(k)}{d(d_f - d_g)} = \frac{\partial(k)}{\partial(d_f)} + \frac{\partial(k)}{\partial(d_g)} = \frac{(r_f - r_g) - (d_f - d_g)}{k} \quad (7)$$

while from (6)

$$\frac{d(k)}{d(d)} = \frac{r - d}{k}. \quad (8)$$

a real-time graphical representation of the boundary of P can now be generated with improved computational efficiency using (6) with the natural identifications $$r = r_f - r_g \quad (9)$$

$$d = d_f - d_g \quad (10)$$

and the consequences of (6)

$$k = (2rd - d^2)^{\frac{1}{2}} \quad (11)$$

$$d = r - (r^2 - k^2)^{\frac{1}{2}}. \quad (12)$$

The radius of curvature of a torical surface along a cross section may be obtained from $$\frac{1}{\gamma} = \frac{1}{\beta} + \frac{1}{\alpha} * \sin^2(\theta) \quad (13)$$

where
$\gamma$ is the radius of curvature along a cross section,
$\beta$ is the maximal $\gamma$ over all cross sections of a particular surface.
$\alpha$ is $\gamma$ for a cross section at right angles to $\beta$ and
$\theta$ is the angle between $\gamma$ and $\beta$.

The effect of prism on the projection can be obtained by translation of coordinates using $$\Delta = \mu \rho \gamma \quad (14)$$

along angle $\epsilon$, where
$\rho$ is the amount of prism,
$\epsilon$ is the orientation of prism,
$\gamma$ is the radius of curvature measured along a cross section determined by $\epsilon$,
$\Delta$ is the displacement of the optical center and
$\mu$ is a constant reconciling the units of $\rho$, $\gamma$ and $\Delta$.

Hence for the toric lenses encountered in ophthalmic optics a one-to-one and onto relationship exists between the parameters of a lens and a plane projection of its homeomorphic orbit, and this relationshop is determinate. Given fixed values for all parameters except the distance between surfaces in L, a smooth relationship exists between this distance and the parameters of P.

The problem is to minimize the distance between surfaces f and g while a region R, defined as the projection of a given spectacle frame onto the plane containing P, is still contained in P. One may use (1) through (14) to obtain the coordinates of the boundary of P, so as to be able to graphically display P, such as onto the screen of a CRT, in order that the at hand frame (or frame pattern) may be manually superimposed on the projection.

Conventionally, the region R is non-uniquely paramatized by the intersection of the rectangle of smallest dimensions containing R and the circle of minimum radius containing R to define a region C centered about a point displaced from the optical grinding center of L by the prescribed decentration.

A value for d such that the associated solid L(d) and projection P(d) are such that C is contained in P(d) is obtained by calculating values for $d(d_f, d_g)$ from $r(r_f, r_g)$ measured from points on the boundary of C to the optical grinding center of L. The maximum value of $d(=d\uparrow)$ is then used as the parameter for initial display of P(d).

Said $d(\rightarrow d^*)$ is then dynamically modified by an operator until circumscription by P(d*) with the coplanar projection of the at hand frame is visually observed. The final d* is used in subsequent calculations to obtain the desired specifications for optimal grinding depth.

A minimum d exists such that $R \subset P(d)$.

proof:

Since $R \subset C$ and $P(d\uparrow) \supset C$, $d\uparrow$ is an upper bound on the desired d.

P(O) is a single point such that $P(O) \subset C$.

Since P varies smoothly in size with d, a least upper bound d' exists such that $P(d') \supset R$ and for this d'

$$\overline{(P(d') - P(d'))} \cap (\overline{R} - R) \neq 0$$

Thus d' would be the desired minimum d acceptable.

Following is a calculation procedure for obtaining final tool settings for grinding a lens blank to optimal depth given d*.

To translate d* into tool settings the critical chord length k* must first be obtained by substituting d* and r* (the radius of curvature along that chord) into (6) and solving for k*. Since the combined focal distance of f and g determines the curves chosen to obtain a given prescription, (15) is computed using d* to obtain the prescribed focal distance along k*.

$$\gamma = \nabla + \mu(r_F - r_B + \nabla) \quad \begin{aligned} \mu &= n - 1 \\ \nabla &= r_F r_B d^* \end{aligned} \quad (15)$$

where $\gamma$ is the desired focal distance along k*, $r_F$ is the radius of curvature along the front curve, $r_B$ is the radius of curvature along the back curve, and n is the refractive index of the lens material.

In ophthalmics either $r_F$ or $r_B$ is given, along with n, making (15) solvable for the unknown radius. Making substitutions k=k*, $r_f=r_F$ and $r_g=r_B$, d can be obtained using (1) through (5). If $d \neq d^*$, d is substituted for d* in (15) and the procedure is repeated until a stable d* appears, whereupon the sphere and cylinder powers are substituted into (15) to obtain the required based and cross curves for grinding. The final values of d* is the minimum finish thickness of the lens blank.

An embodiment of the system comprises a general purpose computer which has an input device which will permit a human operator to send distinct signals to the computer, an output device consisting of a planar display whereon the computer can produce an image of known size and shape, and a suitably coded program capable of interpreting the operator signals, solving the simultaneous equations which define the orbit for specific values of lens parameters and producing a full scale image of said orbit on the planar display. The operator can signal the computer to produce an image for larger or smaller value of d* until an image is obtained such that a specific spectacle frame, pattern or equivalent mechanical device can be held against the display and the image is seen to circumscribe the perimeter of said device.

Additionally there may be a means to store the optimal value of d*, such as in a register of said computer so as to pass said variable onto suitably coded programs which implement the calculation procedures for determining optimal tool settings for grinding a lens blank of a given base curve to a finished lens having minimum overall thickness.

Figure 3:
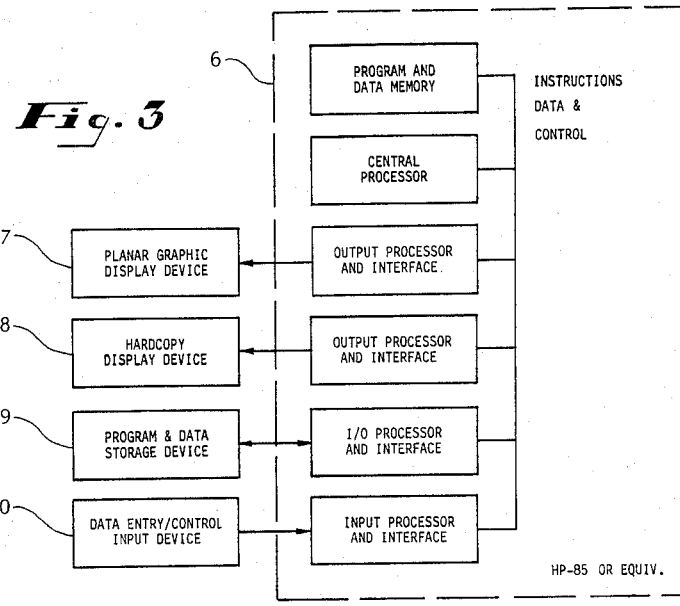
Figure 4:
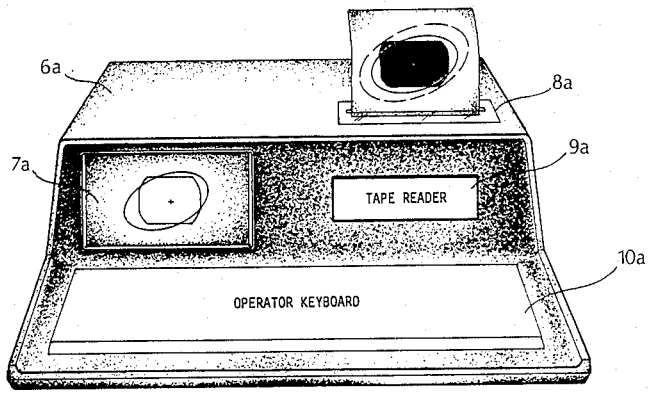

FIG. 3 shows the system architecture of a general purpose computer, said computer being a Hewlett-Packard HP-85 or the like, which is capable of interpreting and responding to signals from an operator, solving equations which define the orbit of a lens, producing a full scale image of said orbit onto a planar display, and storing and acting upon suitably coded program instructions. FIG. 4 shows the computer and its attachment to peripheral devices for operator intervention, graphic display onto a planar CRT screen, graphic display onto a hardcopy printer, and for reading programs stored on magnetic tape.

FIG. 4 additionally shows how either of said graphic display devices may be used as a facsimile to the projection plane 2 of FIG. 1, such that images of regions C and P contained in said plane can be formed on said devices for the purpose of circumscribing the perimeter of a specific spectacle frame, pattern or equivalent mechanical appliance held closely against said images so as to introduce the size and shape of said frame into the calculations for lens thickness optimization described herein, subject to the intervention and visual interpretation of an operator who views said frame from a suitable distance.

Figure 5:
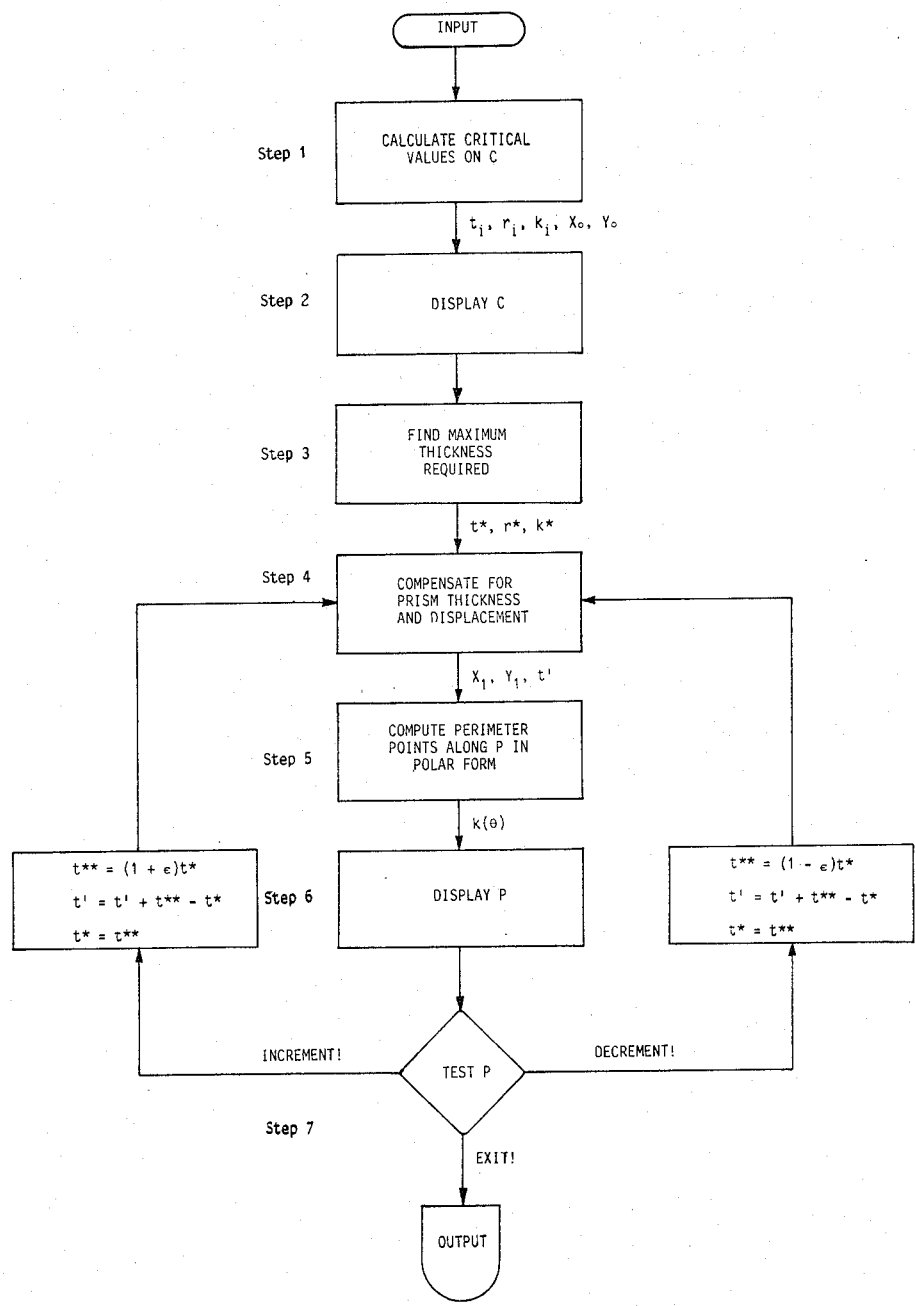
FIG. 5 depicts a program flowchart for calculation of the perimeter values of orbit P as contained in plane 2 of FIG. 1.
Figure 6:
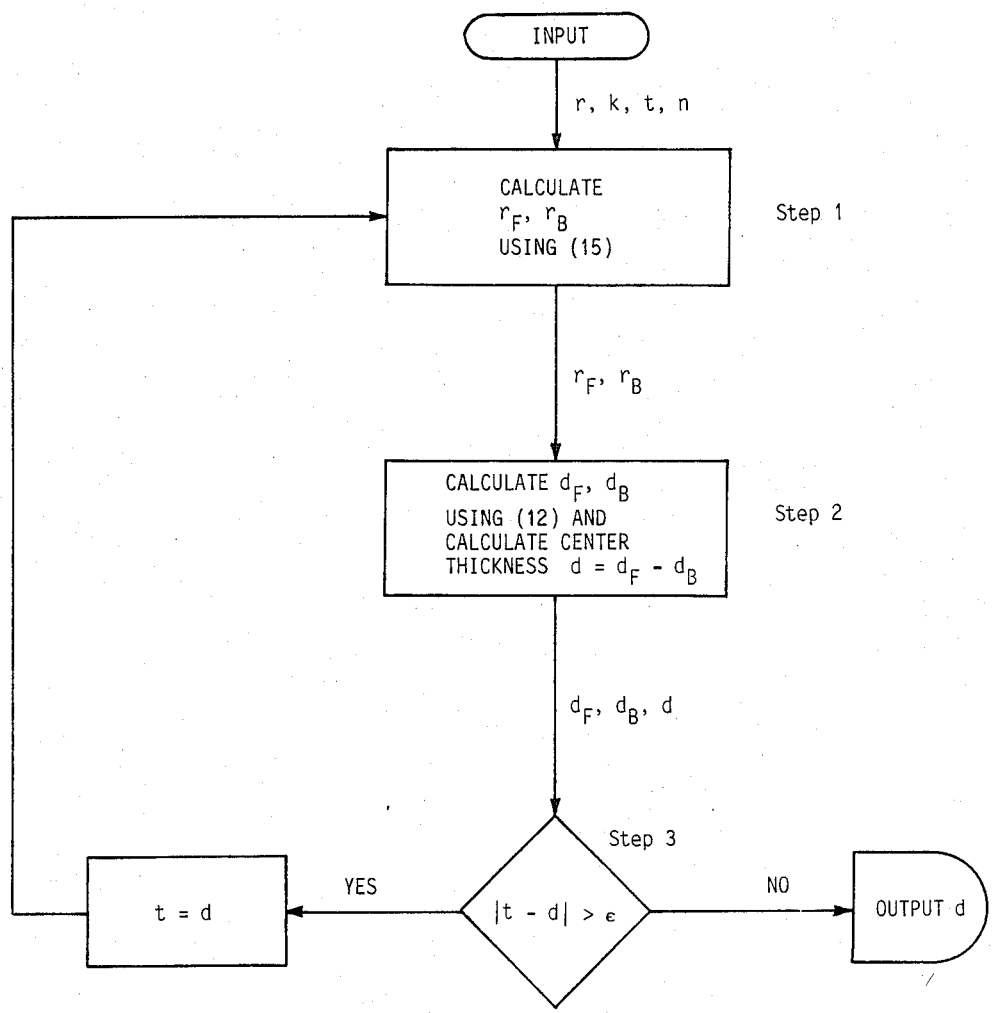
FIG. 6 depicts a program flowchart for calculation of the exact intersurface distance as defined in the flowchart description of FIG. 5.
Figure 7:
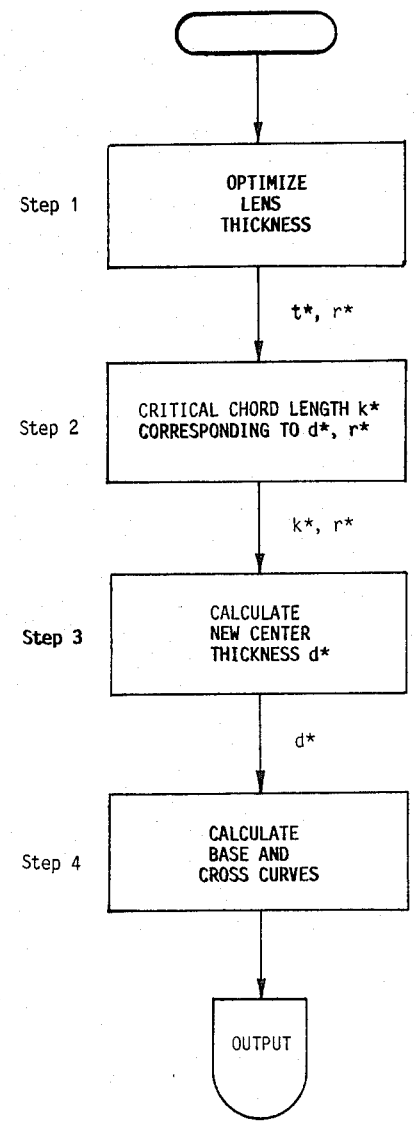
FIG. 7 depicts a program flowchart for calculation of the optimal tool settings for grinding a lens blank of a given base curve into a finished lens having minimum overall thickness.

FIGS. 5, 6 and 7 show flowcharts for suitably coded programs which when used to instruct said computer by methods well-known in the art cause it to implement the graphical methodology, optimization and calculation procedures described herein for determining the optimal ground depth of an ophthalmic lens which is to be retained in a frame of specific size and shape. Specifically, the flowchart descriptions which follow describe procedures for interpreting signals from an operator, solving equations which define the orbit for specific values of lens parameters, producing full scale images of said orbit onto a planar display, expanding and contracting the orbit in response to an operator command, computing and storing the final value of d* obtained, for use in determining final tool settings and calculating optimal values for said tool settings suitable for grinding a semi-finished lens blank of given power to a finished lens having minimum overall thickness. These procedures are based on the general interactive graphical methodology and optimization procedure taught herein.

Referring to FIGS. 5, 6 and 7, INPUT consists of the global prescription parameters of sphere, cylinder and add power, inset decentration, segment location, pupillary distances, cylinder axes, frame parameters (A, B, ED), semi-finished blank curve, optical grinding center (OGC), and optionally, the physical dimensions of the blank. These are available to all flowchart steps as needed.

Referring to the program flowchart shown in FIG. 5, the perimeter values of orbit P may be calculated as follows:

Step 1.

The mechanical center of C is taken to be the origin. By methods well-known in the art, the position of the OGC relative to the origin is calculated from A, B, inset decentration, pupillary distance, segment location, and position of the OGC on the semi-finished blank. Denote this position $(X_o, Y_o)$. From $(X_o, Y_o)$ the distances to: the points of intersection of A·B and $\widehat{ED}$; the center of the intercepted arcs; the sides of the A·B; are calculated by the Pythagorean Theorem. Denote these distances by $k_i$.

Along each $k_i$ calculate the effective power desired using (13) with sphere, cylinder, and angle between cylinder axis and position of chord $k_i$, for $\beta$, $\alpha$ and $\theta$ respectively. For each $k_i$ denote the resulting $\gamma$ by $r_i$.

(a) Substitute $k_i$ for k, $r_i$ for r, in (12) to obtain estimated intersurface distance $t_i$.

(b) Substitute $t_i$ from (a) for $d^*$ into (15) with $r_F$ or $r_B$ replaced appropriately by the curve of the finished side of the semi-finished blank and $\gamma$ replaced by $r_i$ to obtain the unknown opposite curve. This curve and $k_i$ are used to obtain an exact $t_i$, as detailed in the flowchart shown in FIG. 6.

An adequate and efficient algorithm may be formed from using (a) alone, as can be seen by examination of (7) through (12).

Step 2.

The boundary of region C defined by the intersection of the rectilinear region A·B and the circle $\widehat{ED}$ is drawn on the screen using coordinates obtained from Step 1 in conjunction with any of the graphical display routines well-known in the art.

Step 3.

Define the maximum values obtained by Step 1 as $$t^* = \max_i [t_i],$$

$r^* = r_i$, $k^* = k_i$ where $t_i = t^*$.

Step 4.

The vector sum of prescribed prism and prism induced by the displacement of the OGC from the optical center as calculated using (14) is now translated by (14) into displacement $\Delta$, said displacement from $(X_o, Y_o)$ determining the center $(X_1, Y_1)$ from which perimeter values of orbit P will be calculated. Additionally, by use of methods well-known in the art, a compensating thickness will be added to $t^*$ to obtain $t'$.

Step 5.

Calculate the values of perimeter points along P in polar form from the origin $(X_1, Y_1)$ for each $\theta$ using $\gamma$ from (13), with $\beta$, $\alpha$, sphere, cylinder and $\theta$ measured from the cylinder axis and either:

(a) substituting $\gamma$ for r, and $t'$ for d in (11) and then using k for the radial magnitude; or (b) substituting $\gamma$ and the finished side curve in (15) with $d^* = t'$ and solving for the remaining curve, whereupon simultaneous equations (1) through (5) are solved with $d = t'$, $r_f = r_F$ and $r_g = r_B$ to obtain k, the radial magnitude.

Step 6.

The boundary of region P, defined as the plane projection of the boundary of lens L, is drawn on the screen using coordinates obtained from Step 5 in conjunction with any of the graphical display routines well-known in the art.

Step 7.

In order to allow the operator to visually circumscribe a specific frame by adjusting the orbit being displayed on the screen to circumscribe R, an inquiry is made to the operator keyboard to determine either to increment P by a factor of $(1 + \epsilon)$, decrement P by $(1 - \epsilon)$ or else exit the routine thereby outputting final values for $t^*$ and $r^*$.

These values are then used in the calculation of final tool settings and curves suitable for grinding a lens blank to optimal depth.

Referring to the program flowchart shown in FIG. 6, an exact value for intersurface distance as defined in Step 1b of the flowchart description of 'calculation of perimeter values of P' in FIG. 5 may be calculated as follows:

Step 1.

The curve on the finished side of the semi-finished blank is given as either $r_F$ or $r_B$ in (15) depending on whether it is the front or back curve on the lens. Using the prescribed power r, the desired chord length 2k, the estimated thickness t, and the refractive index n, compute $r_F$, $r_B$ using (15). With $\gamma = r$ and $d^* = t$ (15) is solved for the remaining curve.

Step 2.

Substitute k for k, $r_F$ for r in (12) and obtain $d_F$. Substitute k for k, $r_B$ for r in (12) and obtain $d_B$. Calculate the center thickness $d = d_F - d_B$.

Step 3.

If the difference between the estimated center thickness t and the calculated center thickness d is outside the tolerance limit $\epsilon$, repeat the process with d substituted for t, otherwise the calculated center thickness d is determined.

Referring to the program flowchart shown in FIG. 7, optimal tool setting for grinding a lens blank of a given base curve to a finished lens having a minimum overall thickness may be calculated as follows:

Step 1.

This procedure, outlined in the program flowchart for FIG. 5, returns optimized lens thickness $t^*$ and power curve $r^*$ in the critical meridian.

Step 2.

The chord length corresponding to the critical thickness $d^*$ in the critical meridian $r^*$ is found by substituting $r = r^*$ and $d = t^*$ in (11), or alternately $\gamma = r$ and $d^* = t^*$ in (15) along with the finish curve of the semi-finished blank (either $r_F$ or $r_B$ appropriately) and setting $r_f = r_F$, $r_g = r_B$, $d = t^*$ and finally solving (1) through (15) for k. The choice of techniques is made to be consistent with the one selected in Step 1.

Step 3.

This procedure, outlined in the program flowchart for FIG. 6, returns a value for center thickness $d^*(=d)$.

Step 4.

The requisite base curve and cross curve for the unfinished surface, $r_F$ or $r_B$ appropriately, are computed by substituting the sphere and sphere plus power, respectively, into (15) along with the radius of curvature of the finished surface, $r_F$ or $r_B$ appropriately, and the value of $d^*$ from Step 3.

Other embodiments will occur to those skilled in the art and are within the following claims:

What is claimed is:

1. A system for determining the optimal ground depth of an ophthalmic lens having a closed homeomorphic boundary, comprising:

means for graphically projecting an orbit of the prescribed lens;

means for superimposing a projection of a spectacle frame onto the graphical projection of said orbit; and means for dynamically adjusting said orbit to circumscribe the projection of said spectacle frame.

2. The system of claim 1 further including means for determining the optimal lens thickness and means for calculating the final tool settings to obtain that optimal lens thickness.

3. A method of determining the optimal ground depth of an ophthalmic lens having a closed homeomorphic boundary, comprising:

graphically projecting an orbit of the prescribed lens;

superimposing a projection of a spectacle frame onto the graphical projection of said orbit; and dynamically adjusting said orbit to circumscribe the projection of said spectacle frame.

4. The method of claim 3 further including determining the optical lens thickness and calculating the final tool settings to obtain that optimal lens thickness.

* * * * *